April 28, 1942.  G. D. GAMEL ET AL  2,280,945
CAPACITOR TRIPPING DEVICE FOR CIRCUIT BREAKERS
Filed July 31, 1940
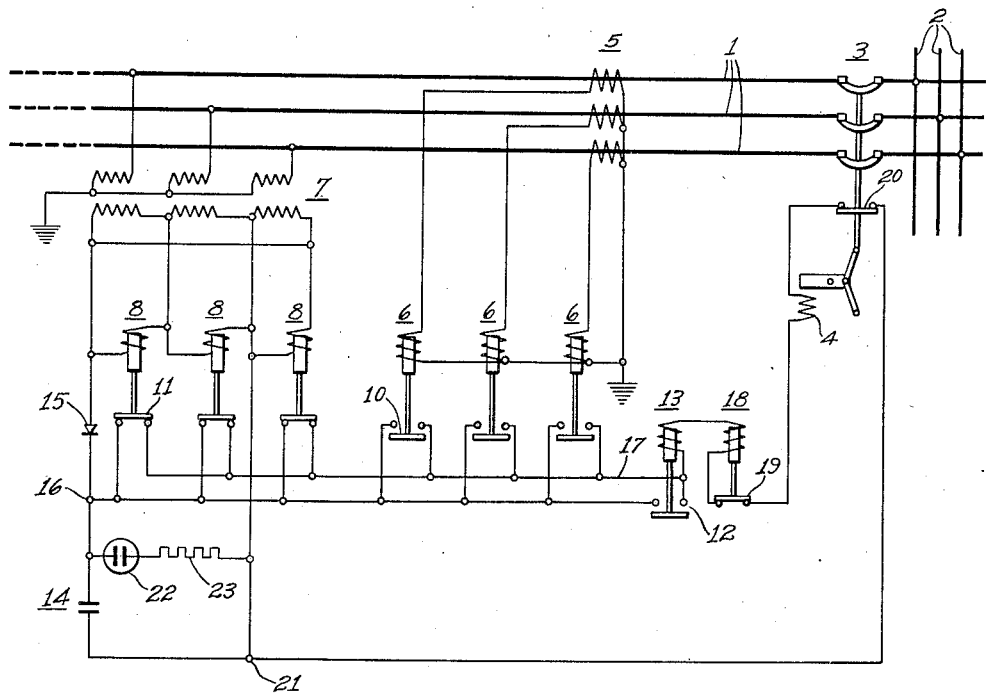
WITNESSES:
INVENTORS
Gayne D. Gamel and
Lloyd W. Dyer.
BY
ATTORNEY Patented Apr. 28, 1942

2,280,945

UNITED STATES PATENT OFFICE 2,280,945

CAPACITOR TRIPPING DEVICE FOR CIRCUIT BREAKERS

Gayne D. Gamel, Verona, and Lloyd W. Dyer, Wilkinsburg, Pa., assignors to Westinghouse Electric & Manufacturing Company, East Pittsburgh, Pa., a corporation of Pennsylvania Application July 31, 1940, Serial No. 348,808

4 Claims. (Cl. 175—294)

Our present invention relates to capacitor tripping devices for circuit breakers, and more particularly it relates to an improvement in the devices which are described and claimed in our previous application Serial No. 284,448, filed July 14, 1939.

In our previous application, a circuit-breaker tripping-device was provided, in which electrical energy for the trip-coil was supplied by a capacitor which was charged from the line-voltage through a rectifier, thus assuring a source of tripping voltage even in the event of a failure of the line-voltage. In our capacitor-tripping device as shown and described in our previous application, an auxiliary switch was utilized on the circuit breaker for disconnecting the circuit breaker trip-coil from the capacitor near the completion of the opening-operation of the breaker. In practical applications embodying the subject-matter of our previous application, it has been demonstrated that the time-constant of the capacitor-discharging circuit through the trip-coil was such that the capacitor would be fully discharged before the moving parts of the circuit breaker could even appreciably start to move in the opening-operation, and that the auxiliary switch on the breaker would unload the capacitor so that it would promptly commence to recharge, after a tripping operation, at a rate requiring some two-tenths of a second, or twelve cycles on a 60-cycle basis, provided that the full line-voltage was available for recharging purposes.

The general object of our present invention is to provide means for securing more than one tripping-impulse from the tripping-capacitor without requiring a recharging of the capacitor after each tripping-operation, thereby making it possible to retrip the breaker from the same capacitor, even in the absence of the line-voltage which is necessary for recharging, in case the circuit-breaker should be reclosed on a faulted line, and also making it possible to restore the full normal charge on the capacitor more quickly when the normal line-voltage is available for recharging-purposes.

A more specific object of our invention is to provide means operative quickly after a completion of the tripping-circuit of a capacitor-trip device, to interrupt the tripping-circuit before the capacitor has lost more than a predetermined fraction of its charge or voltage, but after sufficient energy has been fed into the magnetic circuit of the trip-coil to assure the completion of the tripping-operation after such interruption of the tripping-circuit.

With the foregoing and other objects in view, our invention consists in the apparatus, combinations, circuits, systems and methods hereinafter described and claimed, and illustrated in the accompanying drawing, the single figure of which is a simplified diagrammatic view of circuits and apparatus illustrative of our invention.

As shown in the drawing, our invention is applied to the protection of a three-phase transmission line or feeder 1 which is connected to a load-bus or other bus-means 2 by means of a circuit breaker 3 having a trip-coil 4. In the illustrated embodiment of our invention, the fault-detecting means in the line 1 takes the form of a bank of line-current transformers 5, energizing overcurrent fault-detector relays 6, and a bank of line-energized potential-transformers 7, energizing undervoltage fault-detector relays 8, although other fault-detector means might be utilized. The overcurrent relays 6 have make-contacts 10, and the under-voltage relays 8 have back-contacts 11, all of said contacts being connected in parallel so that a closure of any one will energize the trip-coil 4 of the breaker. The fault-responsive relay-contacts 10 and 11 are also paralleled or shunted by the contacts 12 of a contactor-switch 13, the coil of which is connected in series in the tripping-circuit.

Electrical energy or voltage for the energization of the trip-coil 4 is supplied by means of a capacitor 14, which is charged, through a rectifier 15, from one of the secondary-phases of the line-voltage-responsive potential transformers 7. One terminal 16 of the capacitor is connected to one terminal of the parallel-connected tripping-contacts 10, 11 and 12. The other terminal 17 of the parallel-connected tripping-contacts is connected, through the operating winding of the contactor-switch 13, to the trip-coil 4.

In accordance with our present invention, we provide an auxiliary quick-acting relay 18 having its operating-coil connected in series with the tripping-circuit, and having back-contacts 19 which are also connected in series with the tripping-circuit.

The tripping-circuit is completed through an auxiliary breaker-switch 20, and thence to the second terminal 21 of the capacitor 14. The capacitor is illustrated as being permanently shunted by a circuit containing a glow-lamp 22 and a high discharging-resistor 23 which will relatively slowly discharge the capacitor 14, after a relatively long time after the removal of its charging-voltage, the glow-lamp serving the purpose of indicating the existence of a suitable or adequate tripping-voltage as long as the lamp is lit.

In operation, the line-voltage normally charges the capacitor 14 through the rectifier 15, the charging-circuit extending from the capacitor-terminal 21 to the right-hand secondary-winding of the transformer-bank 7, and thence through the rectifier 15 to the other terminal 16 of the capacitor 14. This causes a unidirectional voltage to appear across the capacitor-terminals 16 and 21, which are utilized as a unidirectional-current bus in lieu of the terminals of a tripping-battery. Upon the occurrence of a line-fault, one or more of the relay-contacts 10 or 11 will close, energizing the tripping-circuit which connects the trip-coil across the terminals 16 and 21 of the capacitor 14. When this happens, three things happen in very quick succession: First, the contactor-switch contact 12 bypasses the more delicate fault-detector contact 10 or 11 and relieves the latter of burden; then our auxiliary relay 18 picks up its back-contact 19 and opens the tripping-circuit; and finally the circuit-breaker 3 opens its main line-connected contacts, and also opens its auxiliary switch 20 so as to insure the continued deenergization of the tripping-circuit, said auxiliary switch 20 being opened before the auxiliary relay contact 19 closes.

It is necessary for the operating-time of the auxiliary relay 18 to be properly chosen so that it will operate very fast, and yet not too fast. From the standpoint of the capacitor 14, it is necessary for the auxiliary relay 18 to open its contact 19 before the capacitor has lost more than a predetermined amount of its stored energy, charge, or voltage, so that it will still have enough remaining charge to effect another tripping-operation without requiring recharging. From the standpoint of the trip-coil 4, it is necessary for the tripping-circuit to remain intact until sufficient flux has been built up, or stored up, in the magnetic circuit of the trip-coil, so that when the relay-contact 19 opens, the magnetic pull of the trip-coil 4 on the circuit-breaker tripping-mechanism will be sufficient to release the trip-mechanism (shown as a latched toggle-linkage) so that the circuit-breaker moving-parts may thereafter open. Usually the relay-contact 19 will open before the moving-parts of the circuit breaker 3 even start to move, or before they appreciably move, in their opening-operation. The size of the capacitor 14 must be so chosen that it will store sufficient electrical energy, on a single charge, to effect, two, three, or more, tripping-operations, as may be desired.

After a tripping-operation, as above described, the capacitor 14 will immediately begin to recharge as soon as the auxiliary-relay contact 19 opens, provided that there is an adequate available line-voltage for recharging the capacitor. In the absence of a suitable recharging-voltage, the capacitor 14 will retain its remaining charge for a certain predetermined period of time, being only slowly discharged through the discharging-resistor 23. If, during this period, the circuit-breaker 3 should be reclosed while the faulty condition still exists on the line 1, the fault-detectors, or one of them, will again complete the tripping-circuit, and the remaining charge on the capacitor 14 will be available to again effect a tripping-operation. The operating-time of the auxiliary relay 18 may be somewhat longer, on the second tripping-operation, because of the somewhat reduced tripping-current which is available to energize the operating-coil of the relay, but this is a desirable condition in view of the somewhat longer time required to build up the necessary magnetic energy in the trip-coil 4 of the breaker at the reduced capacitor-voltage during this second tripping-operation.

While we have illustrated our invention in but a single form of embodiment, we wish it to be understood that various changes may be made by those skilled in the art without departing from the basic principles of our invention. We desired, therefore, that the appended claims shall be accorded the broadest construction consistent with their language.

We claim as our invention:

1. A circuit-breaker system for an alternating-current line, comprising: a circuit breaker having main contacts in series with the line; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; circuit-means for at times energizing said tripping-means from said unidirectional-current bus; and means operative in a predeterminedly short time, independently of the tripping operation of the circuit breaker, after the energization of said tripping-means to deenergize said tripping-means, said short time being sufficiently short to insure that the capacitor does not lose more than a predetermined fraction of its charge, and said short time being sufficiently long to build up sufficient magnetic energy in the tripping-means to carry through the tripping operation.

2. A circuit-breaker system for an alternating-current line, comprising: a circuit breaker having main contacts in series with the line; electrical tripping-means for tripping said circuit-breaker to actuate the latter to an open-circuit condition, a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; circuit-means for at times energizing said tripping-means from said unidirectional-current bus; means operative in a predeterminedly short time, independently of the tripping operation of the circuit-breaker, after the energization of said tripping-means to deenergize said tripping-means, said short time being sufficiently short to insure that the capacitor does not lose more than a predetermined fraction of its charge, leaving sufficient stored energy for a second tripping-operation, and said short time being sufficiently long to build up sufficient magnetic energy in the tripping-means to carry through the tripping operation; and means automatically responsive to a predetermined stage in the opening operation of the circuit breaker for insuring the continued deenergization of the tripping-means while the circuit-breaker is open.

3. A circuit-breaker system for an alternating-current line, comprising: a circuit breaker having main contacts in series with the line; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; circuit-means for at times energizing said tripping-means from said unidirectional-current bus; and an auxiliary relay having an operating winding and a back-contact both in series-circuit relation in the tripping circuit, said relay being operative in a predeterminedly short time after the energization of said tripping-means to deenergize said tripping-means, said short time being sufficiently short to insure that the capacitor does not lose more than a predetermined fraction of its charge, and said short time being sufficiently long to build up sufficient magnetic energy in the tripping-means to carry through the tripping operation.

4. A circuit-breaker system for an alternating-current line, comprising: a circuit breaker having main contacts in series with the line; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; circuit-means for at times energizing said tripping-means from said unidirectional-current bus; an auxiliary relay having an operating winding and a back-contact both in series-circuit relation in the tripping circuit, said relay being operative in a predeterminedly short time after the energization of said tripping-means to deenergize said tripping-means, said short time being sufficiently short to insure that the capacitor does not lose more than a predetermined fraction of its charge, leaving sufficient stored energy for a second tripping-operation, and said short time being sufficiently long to build up sufficient magnetic energy in the tripping-means to carry through the tripping operation; and means automatically responsive to a predetermined stage in the opening operation of the circuit breaker for insuring the continued deenergization of the tripping-means while the circuit-breaker is open.

GAYNE D. GAMEL.
LLOYD W. DYER.